US012698038B2

(12) United States Patent
Kim et al.

(10) Patent No.: US 12,698,038 B2
(45) Date of Patent: Aug. 4, 2026

(54) VEHICLE BODY STRUCTURE

(71) Applicants:Hyundai Motor Company, Seoul (KR); Kia Corporation, Seoul (KR); HYUNDAI MOBIS CO., LTD., Seoul (KR)

(72) Inventors: Do Hoi Kim, Sejong-si (KR); Jong Woo Shim, Suwon-si (KR); You Jin Park, Suwon-si (KR); Jae Sup Byun, Seongnam-si (KR); Jang Ho Kim, Seoul (KR)

(73) Assignees: KIA CORPORATION, Seoul (KR); HYUNDAI MOBIS CO., LTD., Seoul (KR)

( * ) Notice: Subject to any disclaimer, the term of this patent is extended or adjusted under 35 U.S.C. 154(b) by 400 days.

(21) Appl. No.: 18/218,226

(22) Filed: Jul. 5, 2023

(65) Prior Publication Data

US 2024/0124063 A1    Apr. 18, 2024

(30) Foreign Application Priority Data

Oct. 18, 2022    (KR) ........................ 10-2022-0134238

(51) Int. Cl.
| | |
|---|---|
| B62D 25/04 | (2006.01) |
| B60R 13/04 | (2006.01) |
| B62D 25/06 | (2006.01) |
| B62D 27/02 | (2006.01) |
| B62D 29/00 | (2006.01) |

(52) U.S. Cl.
CPC .............. B62D 25/04 (2013.01); B60R 13/04 (2013.01); B62D 25/06 (2013.01); B62D 27/023 (2013.01); B62D 29/004 (2013.01)

(58) Field of Classification Search
CPC ...... B62D 29/001; B62D 25/02; B62D 25/04; B62D 25/06; B62D 29/004; B62D 29/005
See application file for complete search history.

(56) References Cited

U.S. PATENT DOCUMENTS

| | | | | |
|---|---|---|---|---|
| 9,365,166 | B2 * | 6/2016 | Bartlett | ............. B29C 45/14811 |
| 11,104,385 | B2 * | 8/2021 | Kim | ........................ B62D 27/02 |
| 11,358,647 | B1 * | 6/2022 | Newcomb | .............. B62D 25/06 |
| 2005/0082872 | A1 * | 4/2005 | Rich | ........................ B60H 1/243 |
| | | | | 296/187.02 |
| 2016/0229457 | A1 * | 8/2016 | Boettcher | .............. B62D 25/02 |

(Continued)

FOREIGN PATENT DOCUMENTS

| | | | | | |
|---|---|---|---|---|---|
| CN | 104590397 | A | * | 5/2015 | ................ B60J 5/04 |
| JP | 2003002236 | A | * | 1/2003 | ........... B62D 21/157 |

(Continued)

*Primary Examiner* — Robert E Fuller
(74) *Attorney, Agent, or Firm* — Morgan, Lewis & Bockius LLP

(57) ABSTRACT

A vehicle body structure includes a roof side assembly connecting upper end portions of pillars of a vehicle body in a longitudinal direction of the vehicle body, the roof side assembly forming an A-pillar itself, a mounting bracket fixing the roof side assembly to a lower vehicle body, and an external garnish coupled to an outside of the roof side assembly, wherein the roof side assembly includes a pipe extending in the longitudinal direction of the vehicle body, the pipe including a closed cross-section, and a molding member injection-molded with the pipe inserted thereinto.

19 Claims, 22 Drawing Sheets

(56)     References Cited

U.S. PATENT DOCUMENTS

2016/0257344 A1 *  9/2016  Hasegawa ............... B62D 25/04
2016/0332674 A1 *  11/2016  Okuyama ............... B62D 25/06
2017/0267290 A1 *  9/2017  Ayuzawa ............... B62D 25/04

FOREIGN PATENT DOCUMENTS

KR          19990019240  A  *  3/1999  ........... B60R 13/025
KR     10-2015-0104269  A     9/2015
KR     10-2023-0067148  A     5/2023

* cited by examiner

13

67

XXI

69

VEHICLE BODY STRUCTURE

CROSS-REFERENCE TO THE RELATED APPLICATION

The present application claims priority to Korean Patent Application No. 10-2022-0134238, filed on Oct. 18, 2022, the entire contents of which is incorporated herein for all purposes by this reference.

BACKGROUND OF THE PRESENT DISCLOSURE

Field of the Present Disclosure

The present disclosure relates to a vehicle body structure.

DESCRIPTION OF RELATED ART

A vehicle body provides a living space for an occupant and a vehicle cargo space and secures safety of the occupant in the event of vehicle collision or the like. Furthermore, a vehicle body design is significantly important in forming the external design of a vehicle.

In a vehicle body of the related art, A, B, and C pillars are sequentially disposed from the front of the vehicle to the rear thereof, and a space to install the windshield glass is formed between the A-pillars respectively disposed on the opposite sides of the vehicle body. Additionally, each space is formed to install the front door between the A-pillar and the B-pillar, the rear door between the B-pillar and the C-pillar, and the rear windshield glass between the C-pillars respectively disposed on the opposite sides of the vehicle body. Here, these A, B, and C pillars have coupling members respectively formed at the upper portions thereof and respectively coupled to loops.

Structures of the A, B, and C pillars of the related art are connected to each other through welding in a press panel type. Furthermore, after completion of Body in White (BIW), which refers to the stage in vehicle manufacturing when vehicle frames are welded together, a vehicle painting process is performed. Accordingly, the vehicle body of the related art is advantageous for mass production. However, because various devices such as molds are required, it may be difficult to keep up with the future transportation market of diversified small-quantity production.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle body structure configured for easily varying a part of configurations of a vehicle body while reducing the number of vehicle body parts, achieving a competitive edge portion in the future transportation market of diversified small-quantity production.

In accordance with various aspects of the present disclosure, the above and other objects may be accomplished by the provision of a vehicle body structure including a roof side assembly connecting upper end portions of pillars of a vehicle body in a longitudinal direction of the vehicle body, the roof side assembly forming an A-pillar itself, a mounting bracket fixing the roof side assembly to a lower vehicle body, and an external garnish coupled to an outside of the roof side assembly, wherein the roof side assembly includes a pipe extending in the longitudinal direction of the vehicle body, the pipe including a closed cross-section, and a molding member injection-molded with the pipe inserted thereinto.

A plurality of nut members and a plurality of insert brackets may be mounted on the pipe, and the molding member may be molded to expose a portion including the nut members mounted thereon toward interior of the vehicle body and surround the insert brackets.

The molding member may be injection-molded with a plurality of insert nuts inserted thereinto.

The mounting bracket may include an A-pillar mounting bracket coupling the roof side assembly to a fender of the lower vehicle body, and a B-pillar mounting bracket coupling the roof side assembly to an upper end portion of a B-pillar of the lower vehicle body.

The A-pillar mounting bracket may be mounted on interior of the vehicle body of the roof side assembly, and an A-pillar reinforcement may be provided between the outside of the vehicle body of the roof side assembly and the external garnish to be coupled to the external garnish.

The molding member of the roof side assembly may have a plurality of loop coupling holes formed therein and coupled to the external garnish, and the external garnish may have a plurality of loop rings provided therein and respectively inserted into the plurality of loop coupling holes, wherein each of the loop rings may have a closed loop shape partially integrated into the external garnish.

The external garnish may have a plurality of coupling bosses provided therein, wherein each of the coupling bosses may have a coupling screw coupled thereto and configured to penetrate the molding member to be coupled thereto.

The external garnish may have a plurality of hook plates protruding toward the molding member, and the molding member may have a plurality of hook plate holes formed therein and configured to allow the plurality of hook plates to be respectively inserted thereinto and fixed therein.

Each of the hook plates of the external garnish may include a flat plate portion protruding from the external garnish, an elastic piece including one end portion fixed to an internal center portion of a first side surface of the flat plate portion, and a hook protrusion protruding from the elastic piece.

The hook plate hole of the molding member may have side protrusions provided on opposite portions thereof and protruding in an inward direction thereof, wherein the side protrusions may respectively support opposite portions of a second side surface of the flat plate portion in a state in which the hook plates are inserted into the hook plate holes, wherein the other side surface may be opposite to the one side surface from which the hook protrusion protrudes.

The external garnish may have a plurality of loop rings protruding toward the molding member, a plurality of coupling bosses, and a plurality of hook plates, the molding member may have a plurality of loop coupling holes formed therein and configured to allow the plurality of loop rings to be respectively inserted thereinto and fixed therein, and a plurality of hook plate holes formed therein and configured to allow the plurality of hook plates to be respectively inserted thereinto and fixed therein, and the plurality of coupling bosses may have a plurality of coupling screws respectively coupled thereto and configured to penetrate the molding member to be coupled thereto.

The plurality of loop rings may be provided on an upper side of the external garnish in the longitudinal direction of the vehicle body, each of the coupling bosses may be disposed between the loop rings on the upper side of the external garnish, and the plurality of hook plates may be provided in the longitudinal direction of the vehicle body below locations at which the loop rings and the coupling bosses of the external garnish are formed.

The plurality of hook plates may be additionally provided on a front side of the vehicle body of the external garnish.

An A-pillar reinforcement may be provided between the outside of the vehicle body of the roof side assembly and the external garnish to be coupled to the external garnish, and the external garnish may be coupled to the A-pillar reinforcement by a plurality of coupling members coupled thereto in an upward-and-downward direction, a forward-and-rearward direction, and a left-and-right direction thereof.

The plurality of coupling members may include a first A-coupling bolt coupled to the A-pillar reinforcement by penetrating the external garnish from an upper side of a front end portion of the external garnish toward a lower side of the front end portion, a second A-coupling bolt coupled to the A-pillar reinforcement and the molding member by penetrating the external garnish in the left-and-right direction from a side of the external garnish, and a third A-coupling bolt coupled to the A-pillar reinforcement and the molding member by penetrating the external garnish from a rear of the external garnish toward a front thereof.

The molding member may have a garnish mounting boss formed to be integrated into a portion thereof, the portion being connected to an upper end portion of the B-pillar of the lower vehicle body, and the external garnish may have a garnish B-pillar mounting hole formed therein and configured to allow a coupling member coupled to the garnish mounting boss to pass therethrough.

The external garnish may have a rear flange provided at a rear end portion thereof coupled to a C-pillar and formed to surround a rear upper side of the C-pillar, and a C-coupling bolt coupled to the C-pillar by penetrating the rear flange from a rear of the rear flange toward a front thereof.

The external garnish may be formed by connecting a plurality of garnish portions divided in the longitudinal direction of the vehicle body, and the divided garnish portions may be coupled to each other by a hook coupling method.

One of the garnish portions coupled to each other may have a plurality of hooks provided at an end portion thereof and protruding toward the other garnish portion, and the other garnish portion may have a plurality of hook holes provided at an end portion thereof and formed to allow the plurality of hooks to be respectively coupled thereto.

The external garnish may have a thickness reduction portion formed to have a smooth connection portion, wherein the thickness reduction portion may be formed by gradually reducing a thickness of a lower end portion of a portion of the external garnish toward a surface of the pillar, the portion being coupled to the pillar of the vehicle body.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
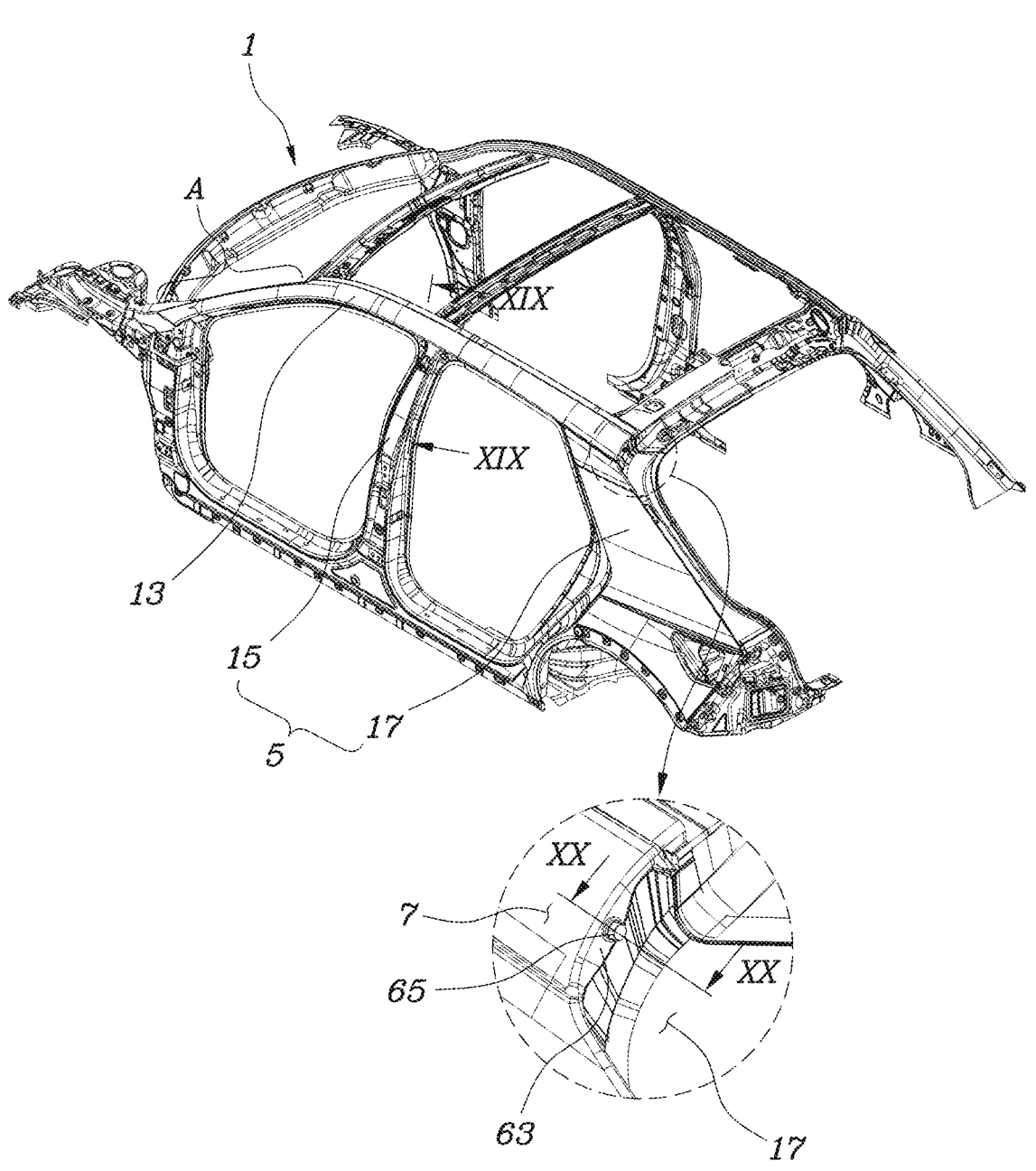
FIG. 1 is a view showing a vehicle body structure according to an exemplary embodiment of the present disclosure.
Figure 2:
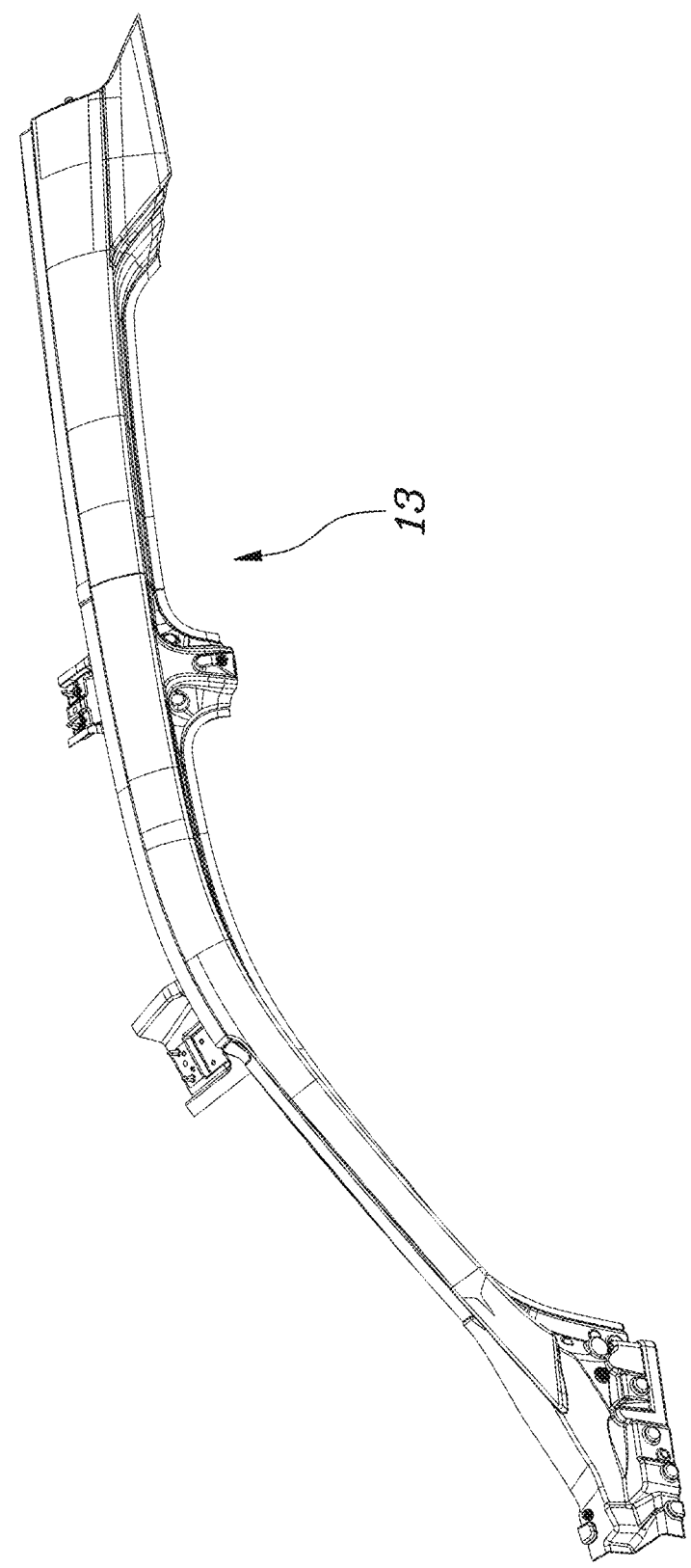
FIG. 2 is a view showing an upper vehicle body in which a roof side assembly and an external garnish in FIG. 1 are combined.
Figure 3:
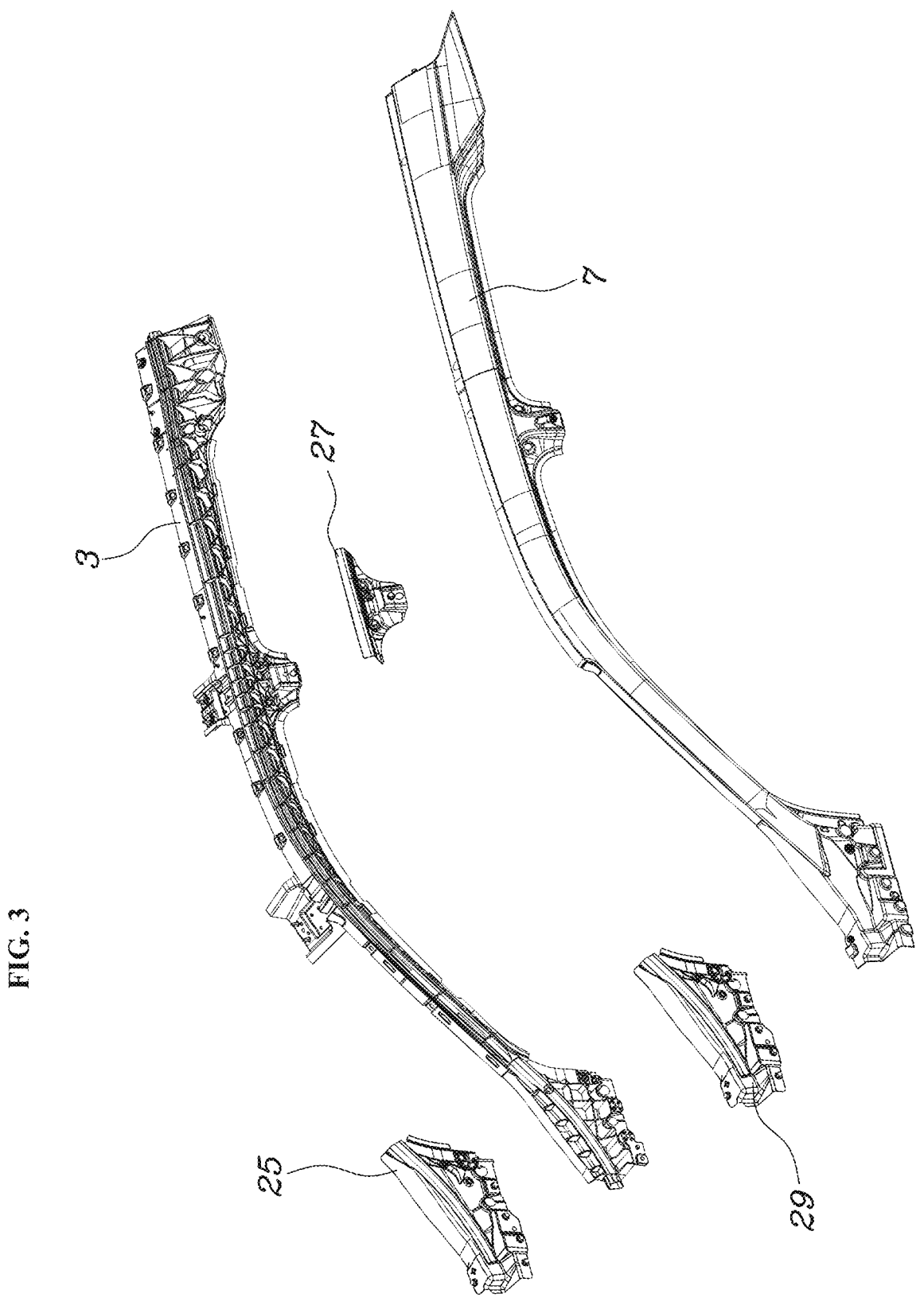
FIG. 3 is an exploded view of the upper vehicle body in FIG. 2.
Figure 4:
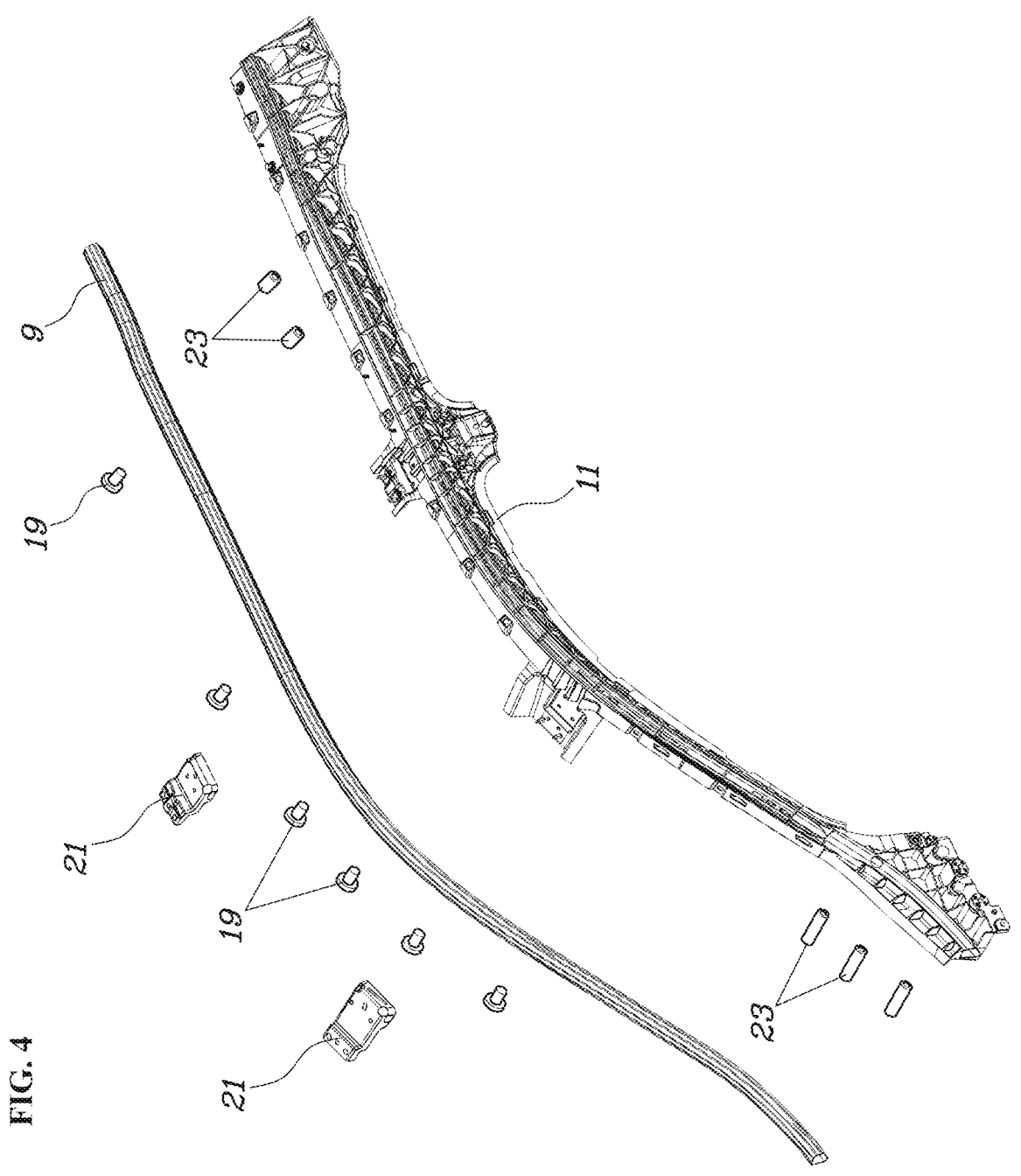
FIG. 4 is an exploded view of the roof side assembly in FIG. 3.
Figure 5:
FIG. 5 is an exploded view of the external garnish in FIG. 3.
Figure 6:
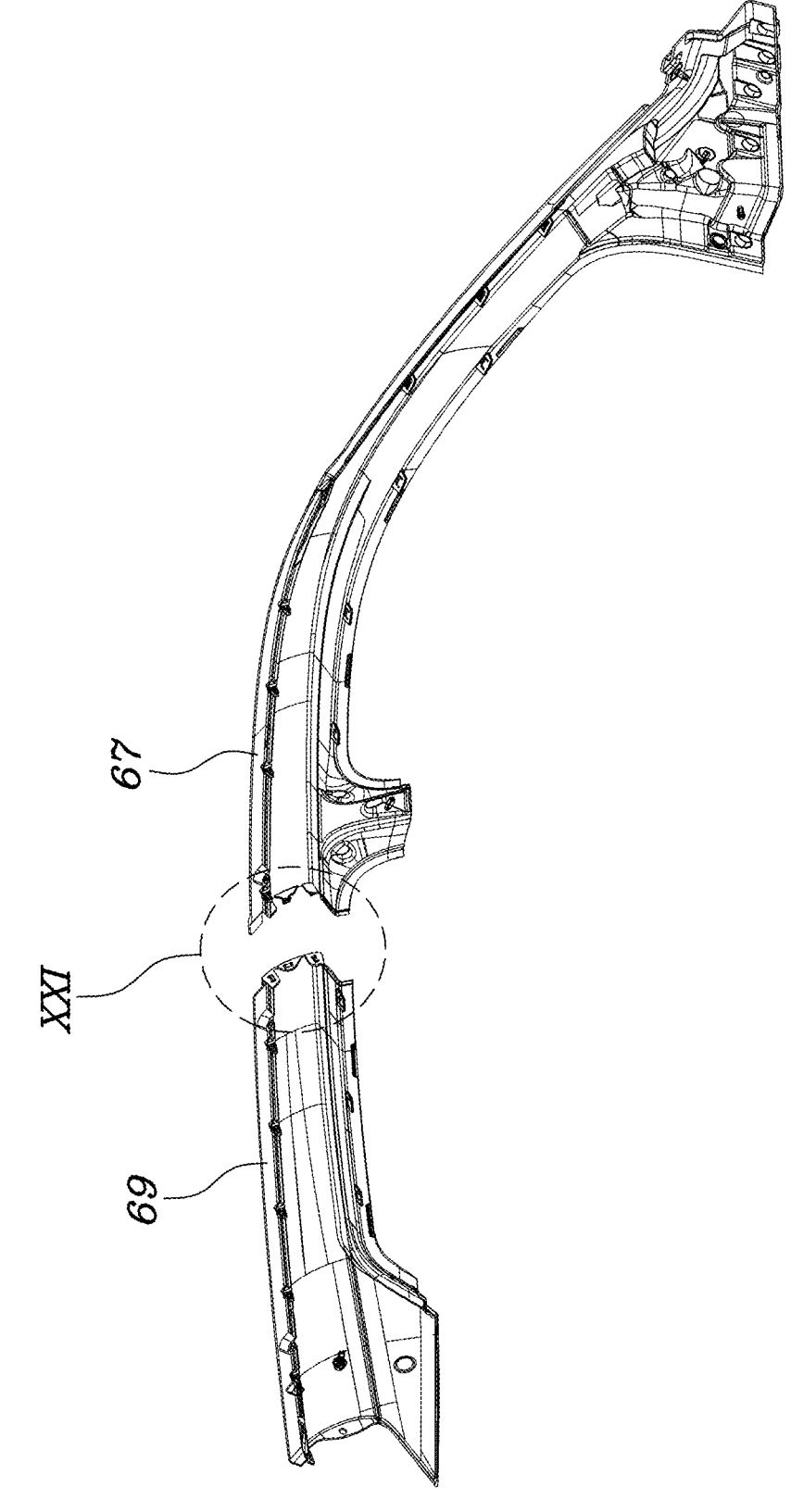
FIG. 6 is a view showing the external garnish in FIG. 5, seen from the opposite side.
Figure 7:
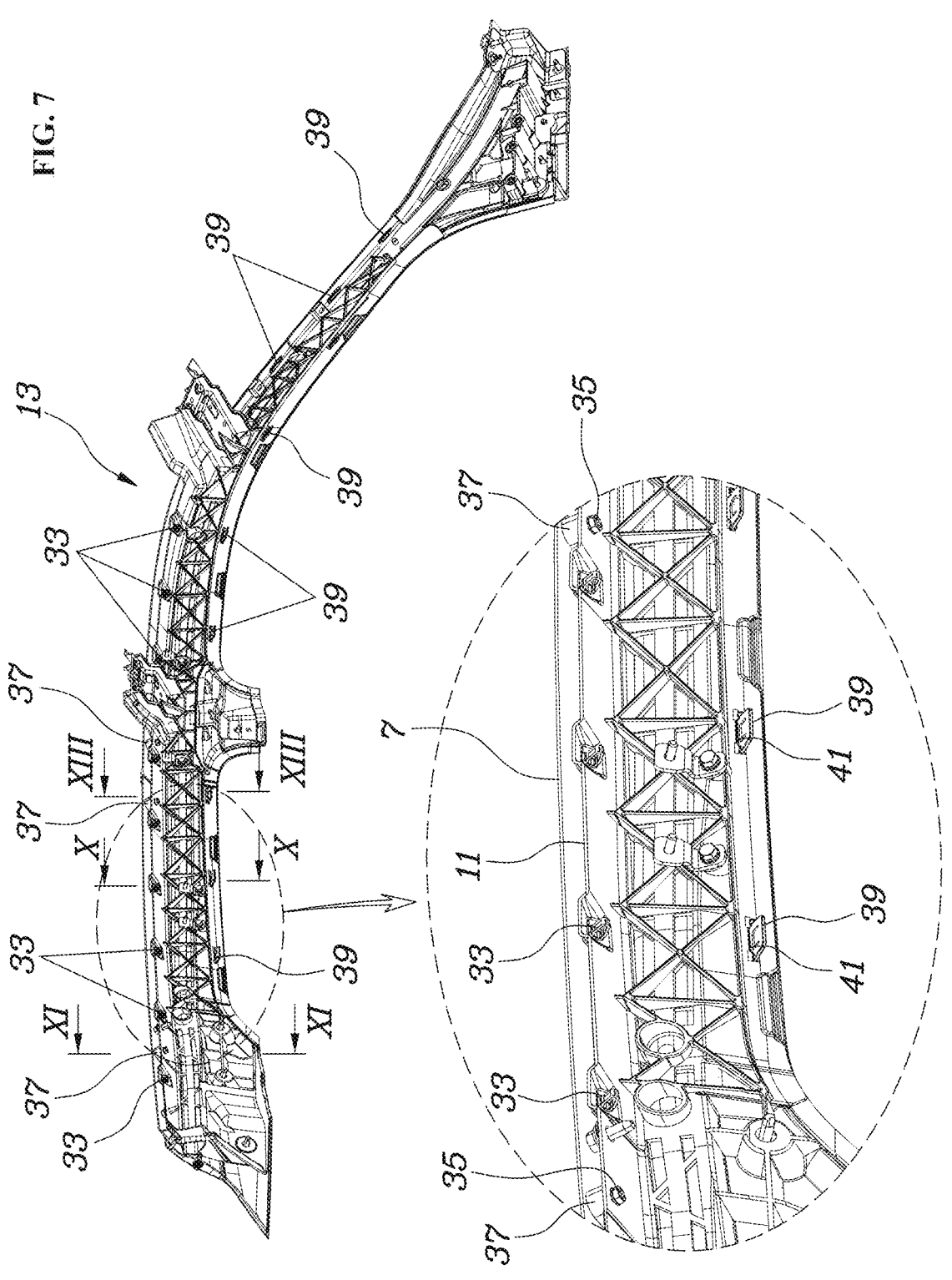
FIG. 7 is a view showing the upper vehicle body in FIG. 2, seen from the opposite side.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

Throughout the drawings, like reference numerals refer to like or equivalent parts.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Reference will now be made in detail to the exemplary embodiments of the present disclosure, examples of which are illustrated in the accompanying drawings. Wherever possible, the same reference numbers will be used throughout the drawings to refer to the same or like parts, and redundant descriptions thereof will be omitted.

Hereinafter, suffixes "module", "unit", and "part" for components used in the following description are merely provided for facilitation of preparing the present specification. Therefore, significant meanings or roles are not provided to the suffixes themselves and it is understood that the expressions "module", "unit", and "part" may be used together or interchangeably.

In describing the exemplary embodiments included herein, when it is determined that the detailed description of publicly known techniques to which the present disclosure pertains may obscure the gist of the present disclosure, the detailed description will be omitted. Furthermore, it may be understood that the accompanying drawings are merely illustrated to easily describe the exemplary embodiments included in the present specification, and therefore, the technical idea included in the present specification is not limited by the accompanying drawings. Furthermore, it should be noted that the accompanying drawings include all modifications, equivalents, and substitutes that fall within the spirit and technical scope of the present disclosure.

Meanwhile, in an exemplary embodiment of the present disclosure, terms such as "first" and/or "second" may be used to describe various components, but the components are not limited by the terms. The terms are used only for distinguishing one component from other components.

When one component is referred to as being "connected" or "joined" to another component, the one component may be directly connected or joined to the other component, but it should be understood that other components may be present therebetween. On the other hand, when the one component is referred to as being "directly connected to" or "directly in contact with" the other component, it should be understood that no other components are present therebetween.

In the present specification, an expression in a singular form also includes the plural sense, unless clearly specified otherwise in context.

It should be understood that expressions such as "comprise" and "have" in the present specification are intended to designate the presence of indicated features, numbers, steps, operations, components, parts, or combinations thereof, but do not exclude the presence or addition of one or more features, numbers, steps, operations, components, parts, or combinations thereof.

Furthermore, a unit or a control unit included in the names of a motor control unit (MCU), a hybrid control unit (HCU), and the like is a term widely used for the name of a control device (controller) configured to control a specific vehicle function, and does not mean a general functional unit.

To control various functions, a controller may include a communication device configured to communicate with another controller or a sensor, a memory configured to store an operating system, a logical command, and input/output information, and one or more processors required to control functions of the controller and configured to perform determination, calculation, and the like.

Referring to FIGS. 1 to 22, an exemplary embodiment of a vehicle body structure of the present disclosure includes a roof side assembly 3 configured to connect the upper end portions of all pillars of a vehicle body 1 in the longitudinal direction of the vehicle body 1, the roof side assembly 3 forming an A-pillar, a plurality of mounting brackets configured to fix the roof side assembly 3 to a lower vehicle body 5, and an external garnish 7 coupled to the outside of the roof side assembly 3, wherein the roof side assembly 3 includes a pipe 9 formed to extend in the longitudinal direction of the vehicle body 1, the pipe 9 including a closed cross-section, and a molding member 11 injection-molded with the pipe 9 inserted thereinto.

That is, according to an exemplary embodiment of the present disclosure, the vehicle body 1 is formed of the lower vehicle body 5 and an upper vehicle body 13, wherein the upper vehicle body 13 is formed of the roof side assembly 3 and the external garnish 7.

For example, in the vehicle body 1 as shown in FIG. 1, a lower B-pillar 15 and a lower C-pillar 17 are components forming the lower vehicle body 5, and the lower vehicle body 5 is provided in common. Here, the upper vehicle body 13 including the roof side assembly 3 and the external garnish 7 according to an exemplary embodiment of the present disclosure is varied depending on the vehicle type and then is coupled to the upper side of the lower vehicle body 5, making it possible to flexibly respond to the future transportation market of diversified small-quantity production.

Furthermore, a more flexible vehicle body structure may be produced by varying both the structure of the lower vehicle body 5 and the roof side assembly 3 and the external garnish 7 forming the upper vehicle body 13.

For reference, in the exemplary embodiment of the present disclosure, although the A-pillar A, the B-pillar 15, and the C-pillar 17 are shown herein as the vehicle body, the present disclosure may also be applied to a vehicle including a D-pillar adopted in sports utility vehicles (SUV) or the like. In the instant case, the roof side assembly 3 and the external garnish 7 of the present disclosure may be connected to the upper end portion of the D-pillar.

Meanwhile, the front portion of the roof side assembly 3 forms the A-pillar itself as described above, and the A-pillar is denoted by the reference character 'A' in FIG. 1.

Figure 13:
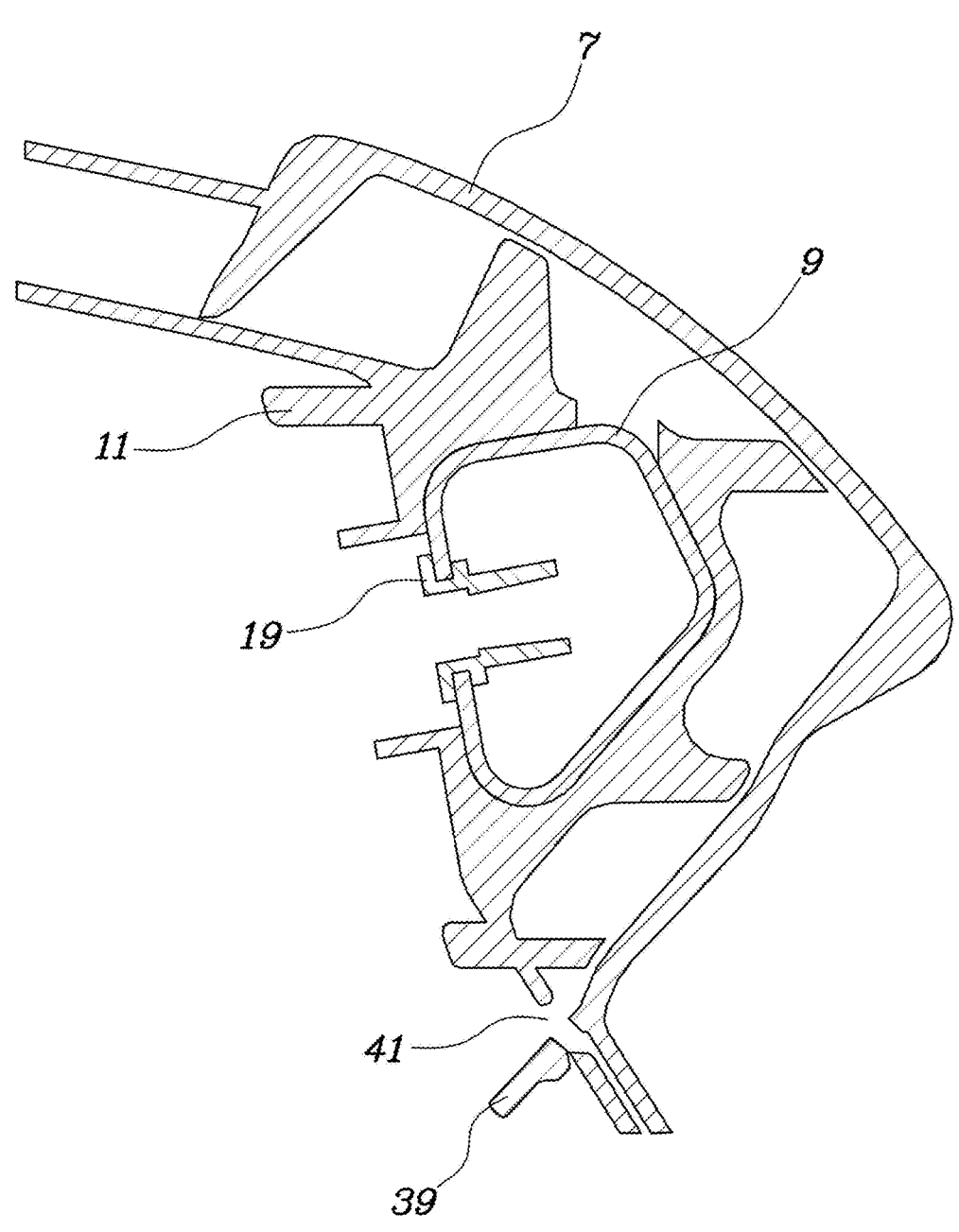
FIG. 13 is a cross-sectional view taken along line XIII-XIII in FIG. 7.
Figure 14:
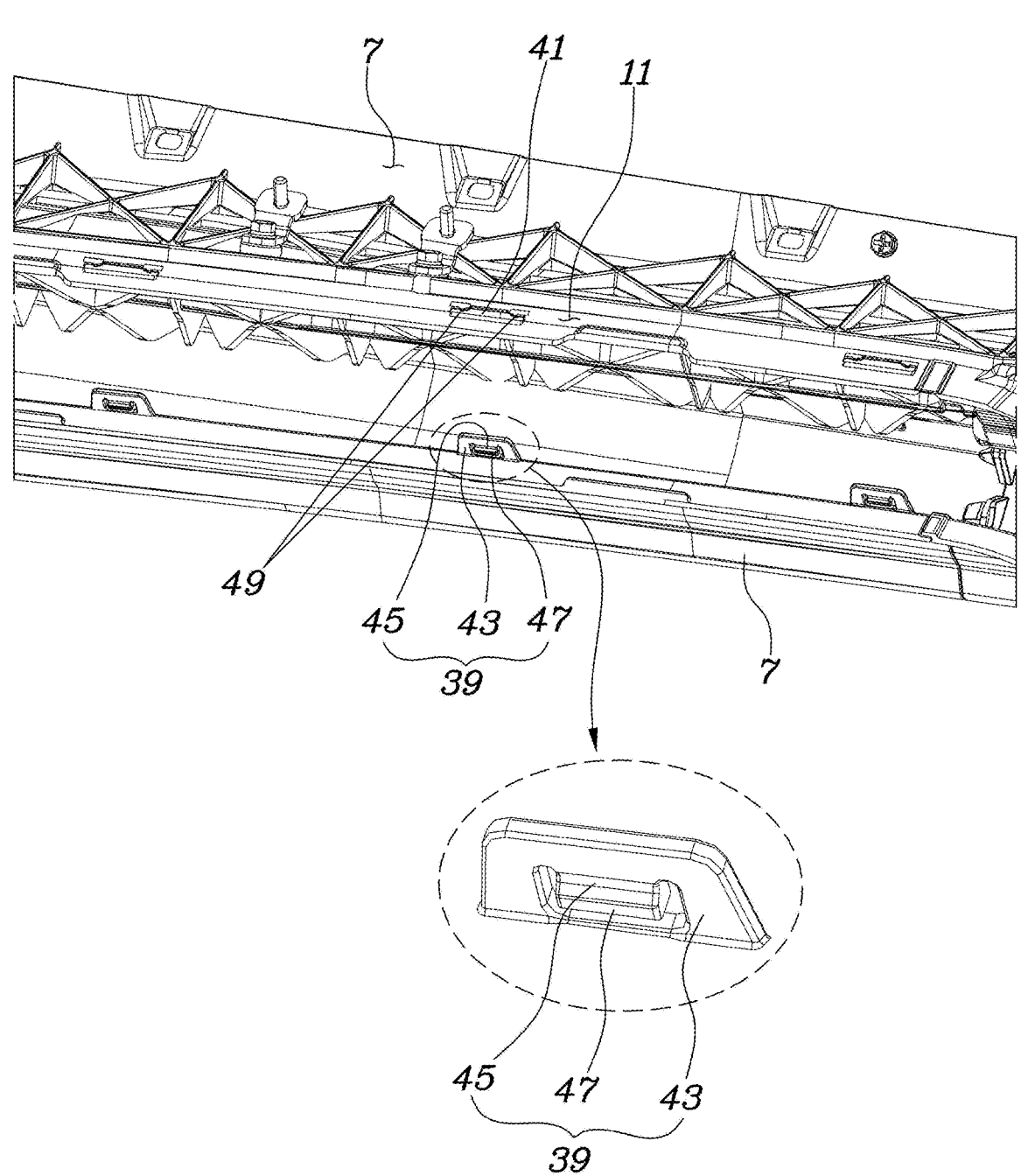
FIG. 14 is a view showing the external garnish and the roof side assembly in FIG. 12, seen from the lower side, and is a detailed view showing a hook plate and a hook plate hole of the present disclosure.

The pipe 9 is made of a metallic material and is configured to secure sufficient strength, and a plurality of nut members (NUTSERT NUTSERT®: registered trademark) 19 and a plurality of insert brackets 21 are mounted on the pipe 9. As shown in FIG. 13, the molding member 11 is molded to expose a portion including the nut member 19 mounted thereon toward the interior of the vehicle body and surround the insert brackets 21.

Bolts or the like configured to fasten various brackets may be coupled to the nut member 19 from the interior of the vehicle body, and the molding member 11 may have a portion formed to surround the insert bracket 21 and coupled to a roof rail or the like.

Furthermore, the molding member 11 is injection-molded with a plurality of insert nuts 23 inserted thereinto, forming a structure configured for being easily coupled to other vehicle body portions such as the lower vehicle body 5.

The plurality of mounting brackets include an A-pillar mounting bracket 25 configured to couple the roof side assembly 3 to a fender of the lower vehicle body 5, and a B-pillar mounting bracket 27 configured to couple the roof side assembly 3 to the upper end portion of the B-pillar 15 of the lower vehicle body 5.

Here, the A-pillar mounting bracket 25 and the B-pillar mounting bracket 27 may be coupled to the roof side assembly 3 by bolting or the like. When the A-pillar mounting bracket 25 and the B-pillar mounting bracket 27 are coupled to the lower vehicle body 5, coupling therebetween may also be performed by bolting or the like, making it possible to effectively achieve diversified small-quantity production in a smart factory.

Of course, in addition to the above-mentioned brackets or the like, additional brackets may be further provided to couple the roof side assembly 3 to the lower vehicle body 5.

The A-pillar mounting bracket 25 is mounted on interior of the vehicle body of the roof side assembly 3 and an A-pillar reinforcement 29 is provided between the outside of the vehicle body of the roof side assembly 3 and the external garnish 7 for coupling therebetween, sufficiently securing the rigidity of the front end portion of the upper vehicle body 13.

The molding member 11 of the roof side assembly 3 includes a plurality of loop coupling holes 31 formed therein and coupled to the external garnish 7, and the external garnish 7 includes a plurality of loop rings 33 provided therein and formed to have a closed loop shape partially integrated thereinto, wherein each of the loop rings 33 is inserted into a corresponding one of the plurality of loop coupling holes 31.

When the loop ring 33 is inserted into the loop coupling hole 31, the loop ring 33 is elastically deformed to be inserted into the loop coupling hole 31, forming a fixed state therebetween. In the present manner, it is possible to maintain a coupled state between the molding member 11 and external garnish 7.

Furthermore, the external garnish 7 includes a plurality of coupling bosses 37 provided therein, wherein each of the coupling bosses 37 includes a coupling screw 35 coupled thereto and configured to penetrate the molding member 11 to be coupled to the same.

As described above, a plurality of coupling screws 35 are coupled to the molding member 11, making it possible to form a more stable coupled state between the external garnish 7 and the molding member 11. It is possible to reinforce the insufficient coupled state between the loop ring 33 and the loop coupling hole 31.

Furthermore, the external garnish 7 includes a plurality of hook plates 39 formed to protrude toward the molding member 11, and the molding member 11 includes a plurality of hook plate holes 41 formed therein and configured to allow the plurality of hook plates 39 to be respectively inserted thereinto and fixed therein.

Here, each of the hook plates 39 of the external garnish 7 includes a flat plate portion 43 formed to protrude from the external garnish 7, an elastic piece 45 including one end portion thereof fixed to the internal center portion of one side surface of the flat plate portion 43, and a hook protrusion 47 formed to protrude from the elastic piece 45.

Furthermore, the hook plate hole 41 of the molding member 11 includes side protrusions 49 respectively provided on the opposite portions thereof and protruding in an inward direction of the hook plate hole 41, wherein the side protrusions 49 respectively support the opposite portions of the other side surface of the flat plate portion 43 in the state in which the hook plate 39 is inserted into the hook plate hole 41. Here, the other side surface is opposite to the one side surface from which the hook protrusion 47 protrudes.

Therefore, when the hook plate 39 is inserted into the hook plate hole 41, the elastic piece 45 is elastically deformed while the hook protrusion 47 contacts with the hook plate hole 41. In the instant case, because the side protrusions 49 do not interfere with the elastic piece 45, the elastic piece 45 is easily deformed and inserted into the hook plate hole 41. When the hook protrusion 47 of the elastic piece 45 is coupled to the hook plate hole 41 by passing through the same, the side protrusions 49 restrict the movement of the opposite portions of the flat plate portion 43. Accordingly, the hook protrusion 47 of the elastic piece 45 is prevented from easily exiting the hook plate hole 41, achieving a solid assembly state.

That is, in the exemplary embodiment of the present disclosure, the external garnish 7 includes the plurality of loop rings 33 formed to protrude toward the molding member 11, the plurality of coupling bosses 37, and the plurality of hook plates 39. The molding member 11 includes the plurality of loop coupling holes 31 configured to allow the plurality of loop rings 33 to be respectively inserted thereinto and fixed therein, and the plurality of hook plate holes 41 configured to allow the plurality of hook plates 39 to be respectively inserted thereinto and fixed therein, making it possible to perform simple coupling therebetween using elastic force. In the present coupled state, each of the coupling screws 35 passes through the molding member 11 to be coupled to a corresponding one of the plurality of coupling bosses 37, making it possible to secure a more stable coupled state.

Figure 8:
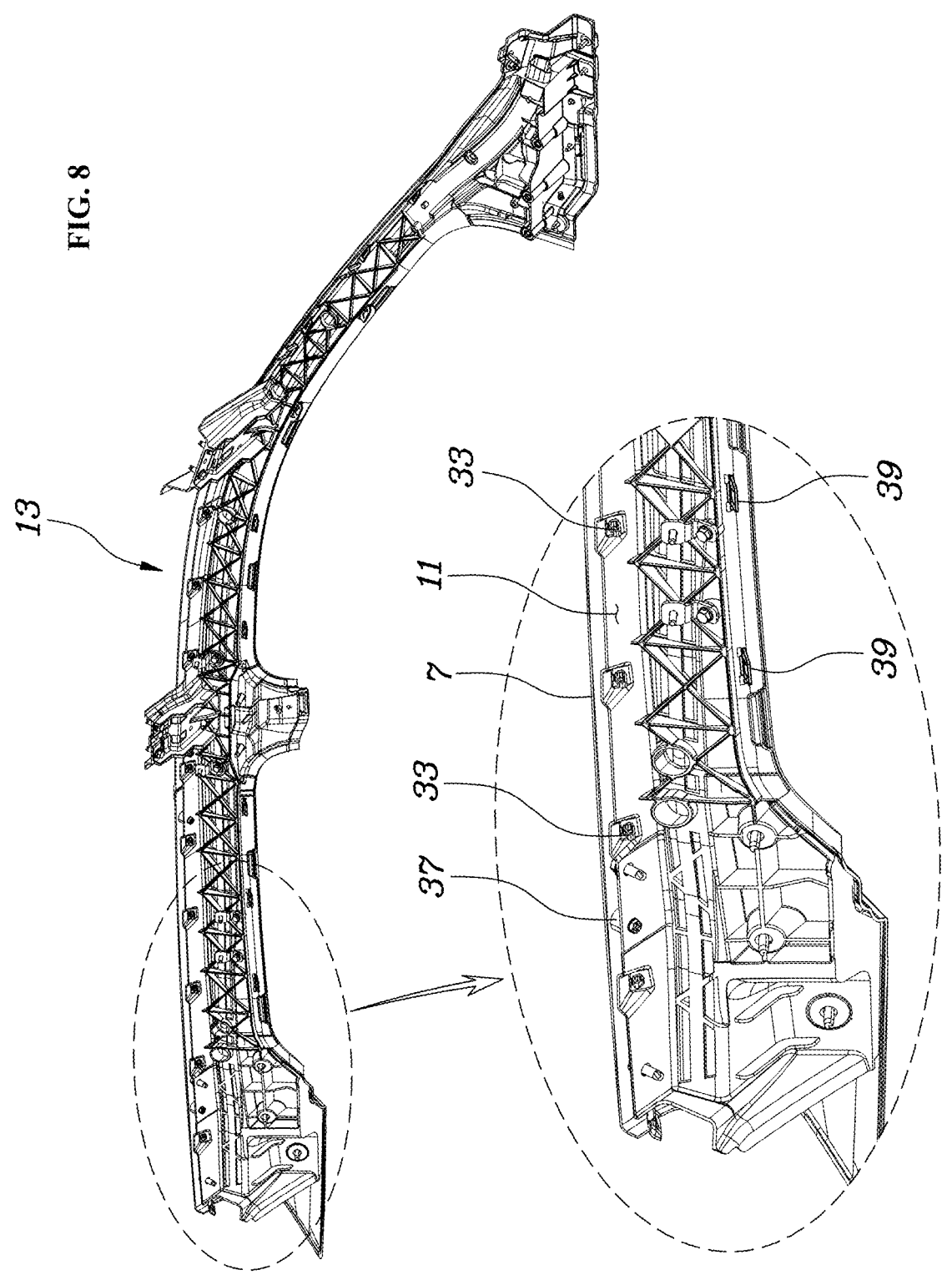
FIG. 8 is a view showing the upper vehicle body in FIG. 7, seen from another angle.
Figure 9:
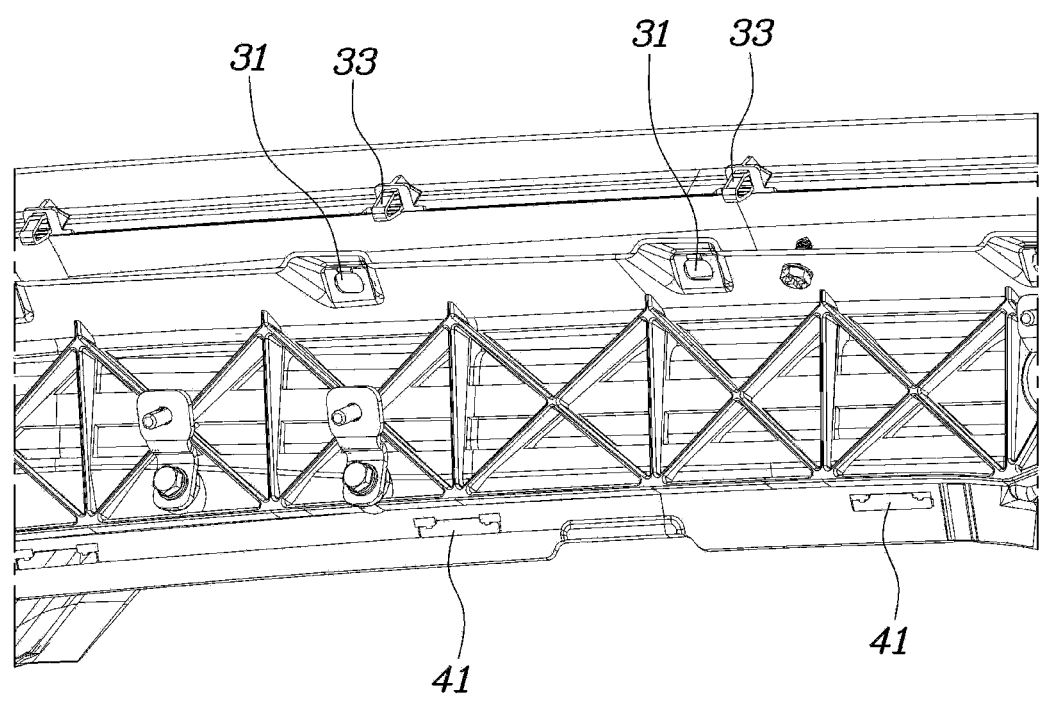
FIG. 9 is a view showing the external garnish in a state of being spaced from the roof side assembly in FIG. 8.
Figure 10:
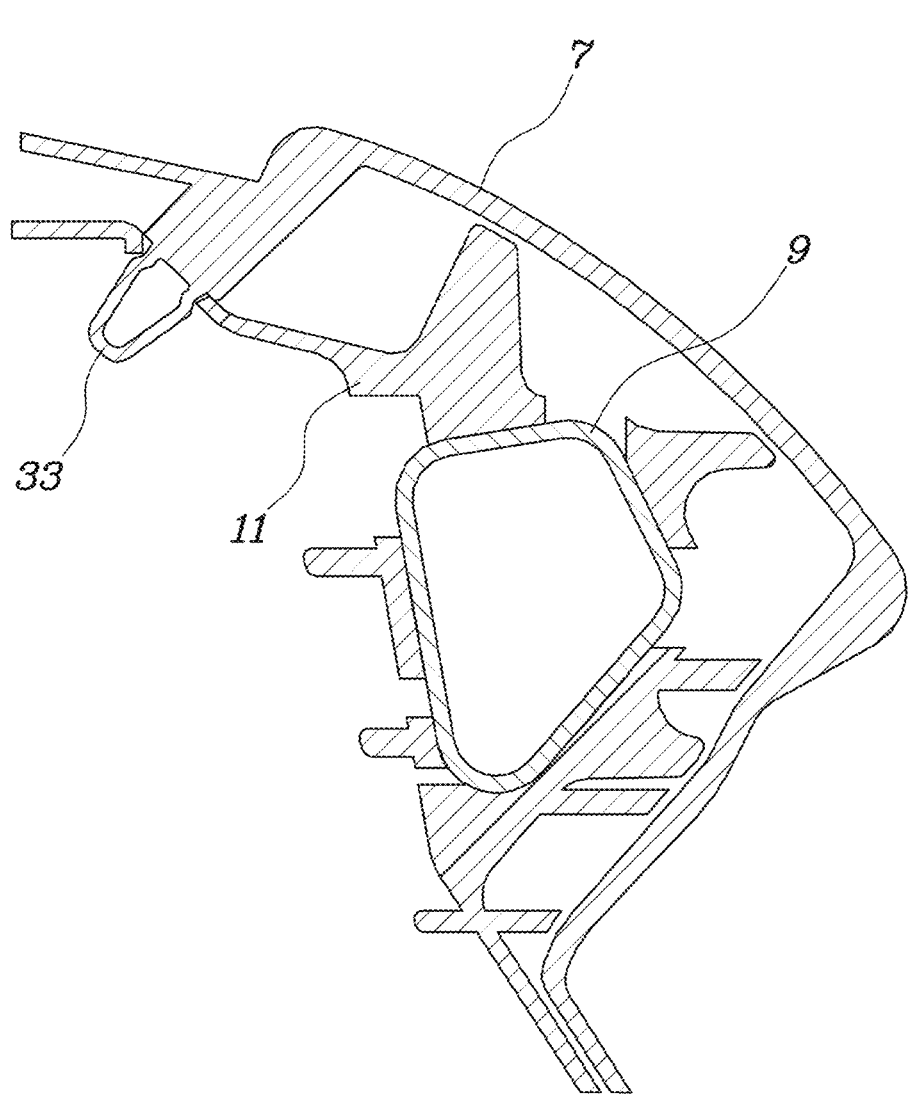
FIG. 10 is a cross-sectional view taken along line X-X in FIG. 7.
Figure 11:
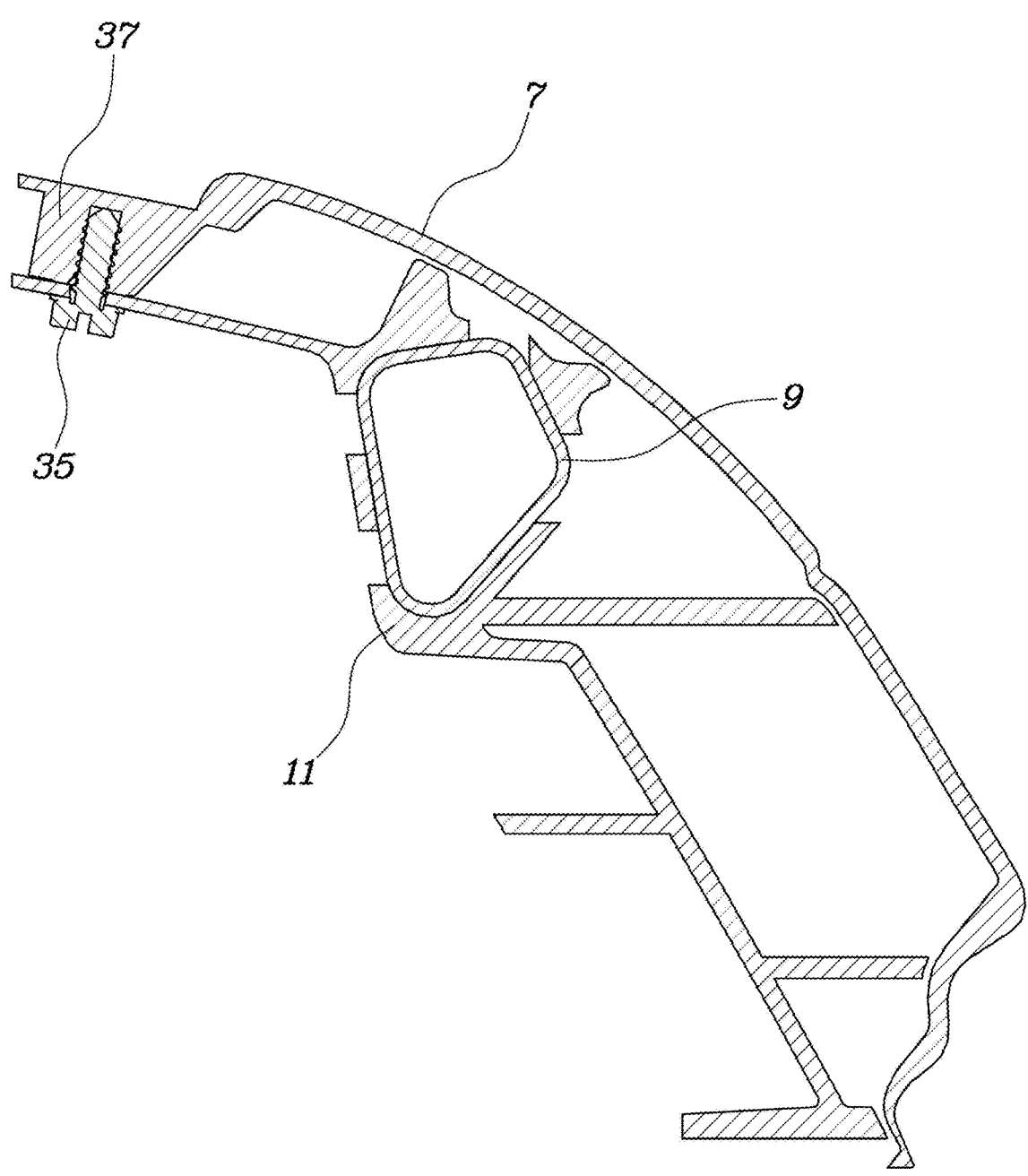
FIG. 11 is a cross-sectional view taken along line XI-XI in FIG. 7.
Figure 12:
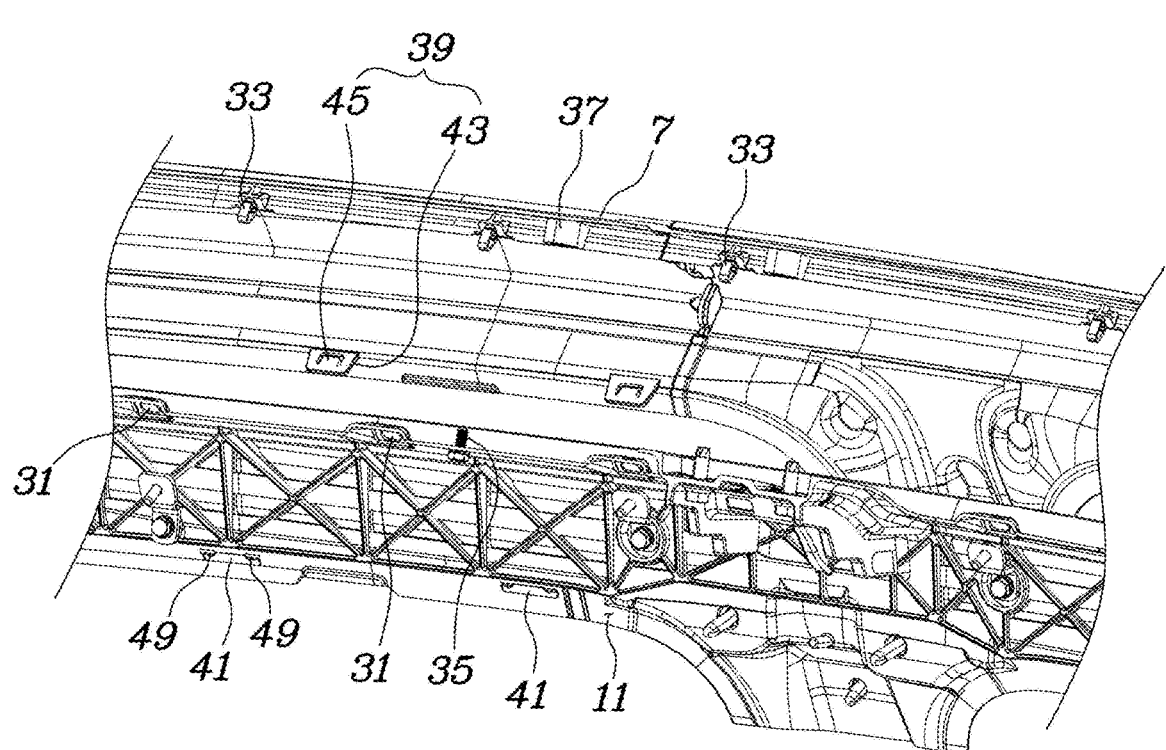
FIG. 12 is a view showing the external garnish and the roof side assembly in FIG. 9, seen from another angle, and is a detailed view showing a loop ring, a loop coupling hole, a coupling boss, and a coupling screw of the present disclosure.

As shown in FIG. 8, in the exemplary embodiment of the present disclosure, the plurality of loop rings 33 are provided on the upper side of the external garnish 7 in the longitudinal direction of the vehicle body, each of the coupling bosses 37 is disposed between the loop rings 33 on the upper side of the external garnish 7, and the plurality of hook plates 39 are provided in the longitudinal direction of the vehicle body below locations at which the loop rings 33 and the coupling bosses 37 of the external garnish 7 are respectively formed.

Furthermore, the plurality of hook plates 39 are also provided on the front side of the vehicle body of the external garnish 7.

Accordingly, the external garnish 7 and the roof side assembly 3 may be stably coupled to each other in all directions.

Figure 15:
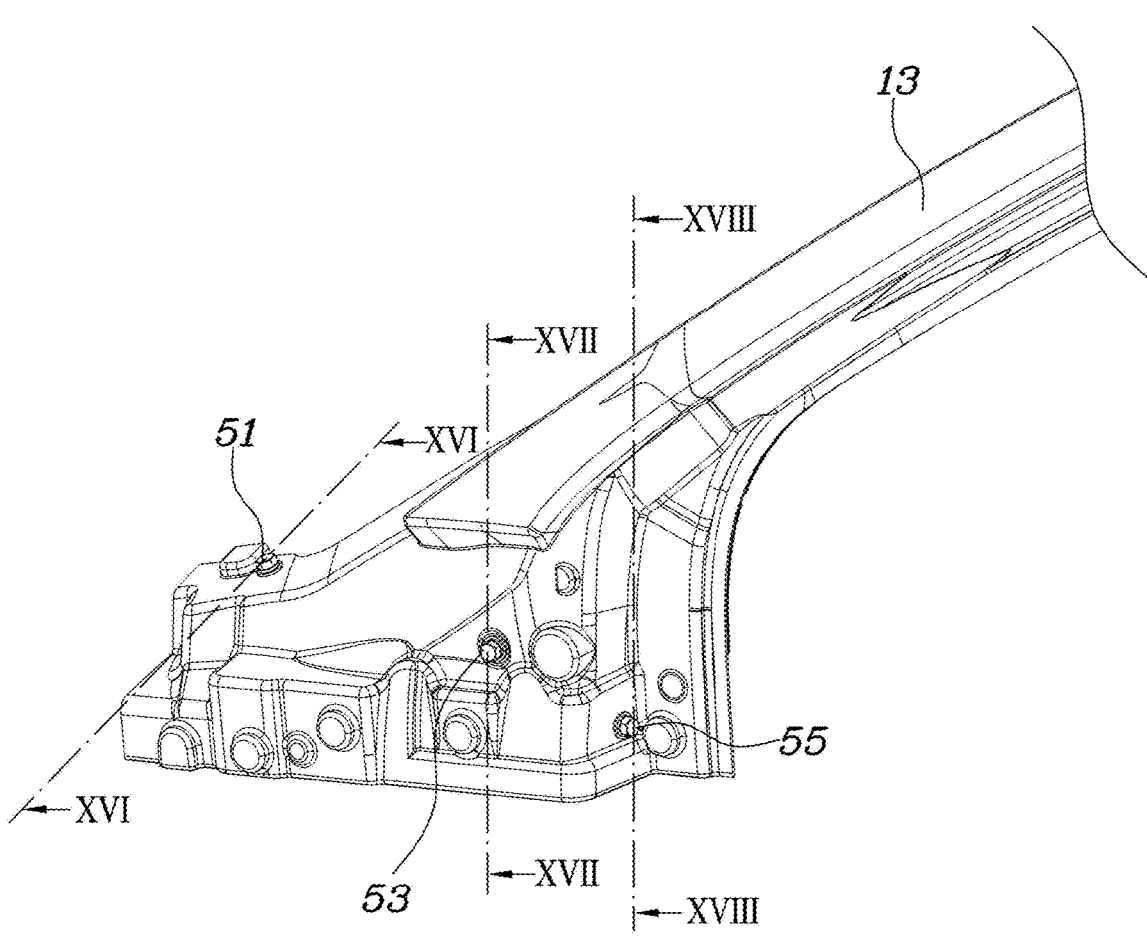
FIG. 15 is a detailed view of the front end portion of the upper vehicle body.
Figure 16:
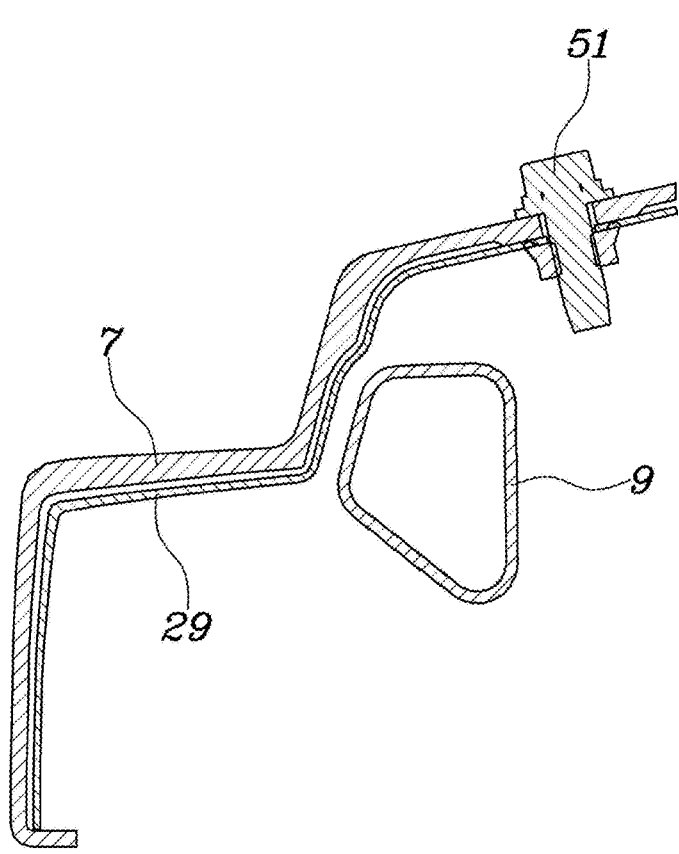
FIG. 16 is a cross-sectional view taken along line XVI-XVI in FIG. 15.
Figure 17:
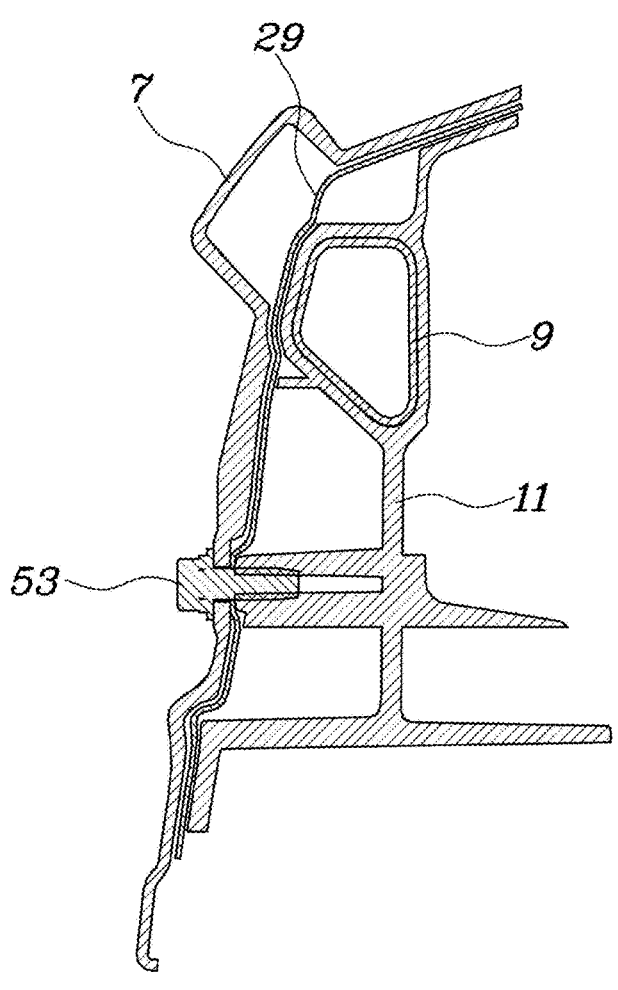
FIG. 17 is a cross-sectional view taken along line XVII-XVII in FIG. 15.
Figure 18:
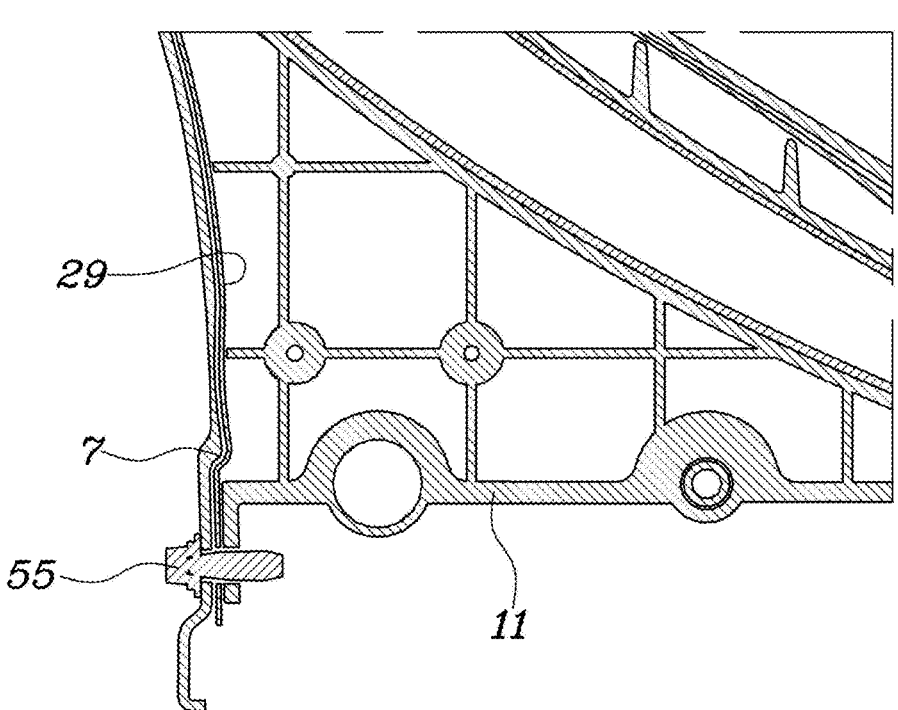
FIG. 18 is a cross-sectional view taken along line XVIII-XVIII in FIG. 15.

Referring to FIG. 15, the external garnish 7 is coupled to the A-pillar reinforcement 29 by a plurality of coupling members coupled thereto in the upward-and-downward direction, the forward-and-rearward direction, and the left-and-right direction thereof.

The plurality of coupling members include a first A-coupling bolt 51 coupled to the A-pillar reinforcement 29 by penetrating the external garnish 7 from the upper side of the front end portion of the external garnish 7 toward the lower side of the front end portion thereof, a second A-coupling bolt 53 coupled to the A-pillar reinforcement 29 and the molding member 11 by penetrating the external garnish 7 in the left-and-right direction from the side of the external garnish 7, and a third A-coupling bolt 55 coupled to the A-pillar reinforcement 29 and the molding member 11 by penetrating the external garnish 7 from the rear of the external garnish 7 toward the front thereof.

Desirably, the first A-coupling bolt 51, the second A-coupling bolt 53, and the third A-coupling bolt 55 are coupled thereto in a direction orthogonal to each other, allowing the external garnish 7 and the A-pillar reinforcement 29 to be mutually restrained in all directions in space. The configuration of the present disclosure as described above means that the first A-coupling bolt 51, the second A-coupling bolt 53, and the third A-coupling bolt 55 are coupled to each other while being orthogonal to each other within a substantial range.

Figure 19:
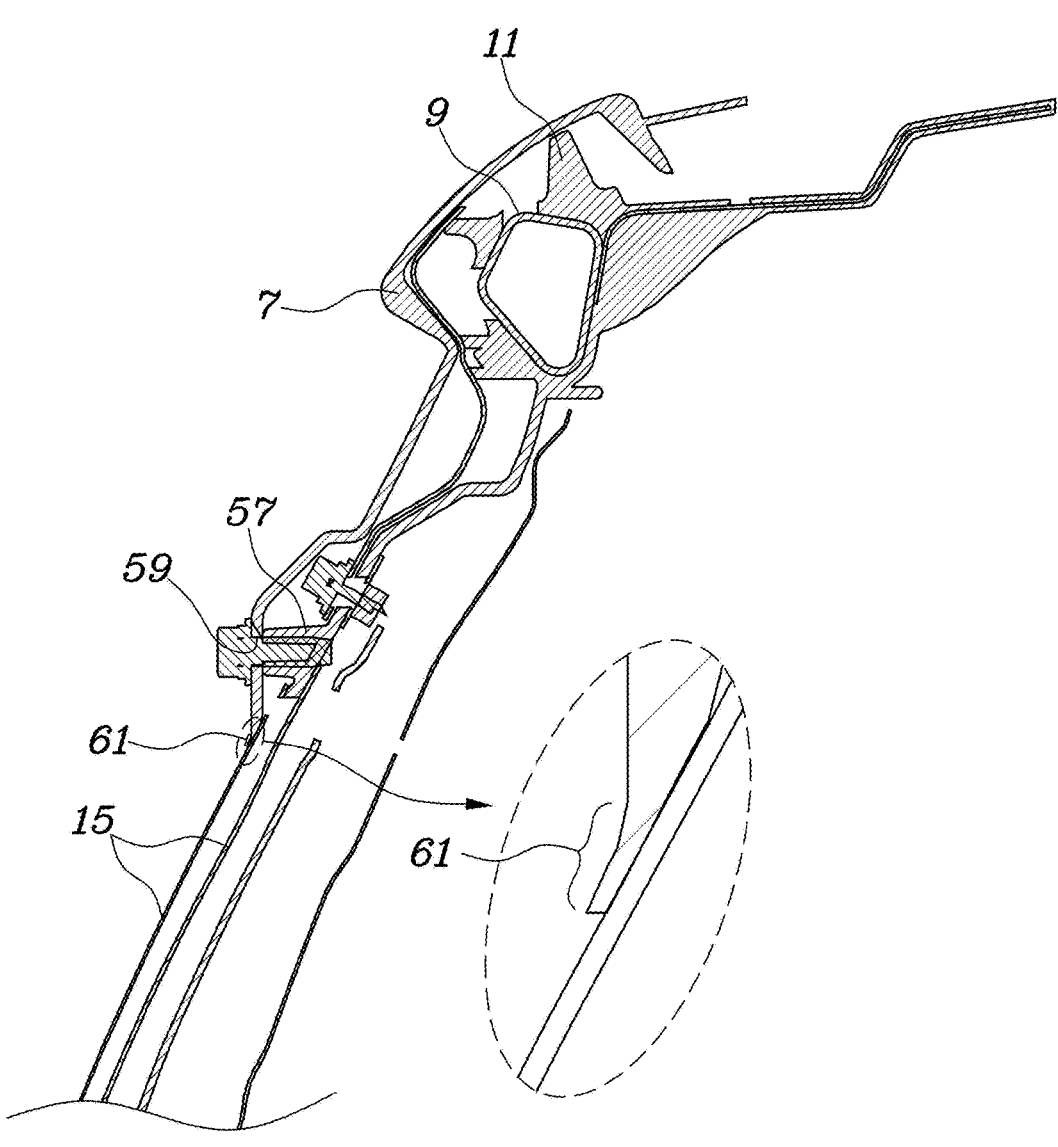
FIG. 19 is a cross-sectional view taken along line XIX-XIX in FIG. 1.

Referring to FIG. 19, a garnish mounting boss 57 is formed to be integrated into a portion of the molding member 11, the portion being connected to the upper end portion of the B-pillar 15 of the lower vehicle body 5, and a garnish B-pillar mounting hole 59 is formed in the external garnish 7 to allow a coupling member coupled to the garnish mounting boss 57 to pass therethrough.

Therefore, the external garnish 7 is more stably coupled to the molding member 11 at the portion to which the B-pillar 15 is connected, and the portion of the molding member 11 in the vicinity of the garnish mounting boss 57 is securely fixed to the B-pillar 15 with a separate bolt. As a result, the external garnish 7 is securely attached to the outside of the B-pillar 15.

Furthermore, the external garnish 7 includes a thickness reduction portion 61 formed to have a smooth connection portion, wherein the thickness reduction portion 61 is formed by gradually reducing the thickness of the lower end portion of a portion of the external garnish 7 toward the surface of the pillar, the portion being coupled to the pillar of the vehicle body.

That is, as illustrated in FIG. 19, the thickness reduction portion 61 is provided at a portion where the lower end portion of the external garnish 7 is connected to the B-pillar 15, forming a smooth connection portion without a noticeable step difference at the portion where the external garnish 7 and the B-pillar 15 meet, and contributing to improvement in the appearance of the vehicle body.

The external garnish 7 includes a rear flange 63 provided at the rear end portion thereof coupled to the C-pillar 17 and formed to surround the rear upper side of the C-pillar 17, and a C-coupling bolt 65 coupled to the C-pillar 17 by penetrating the rear flange 63 from the rear of the rear flange 63 toward the front thereof.

Figure 20:
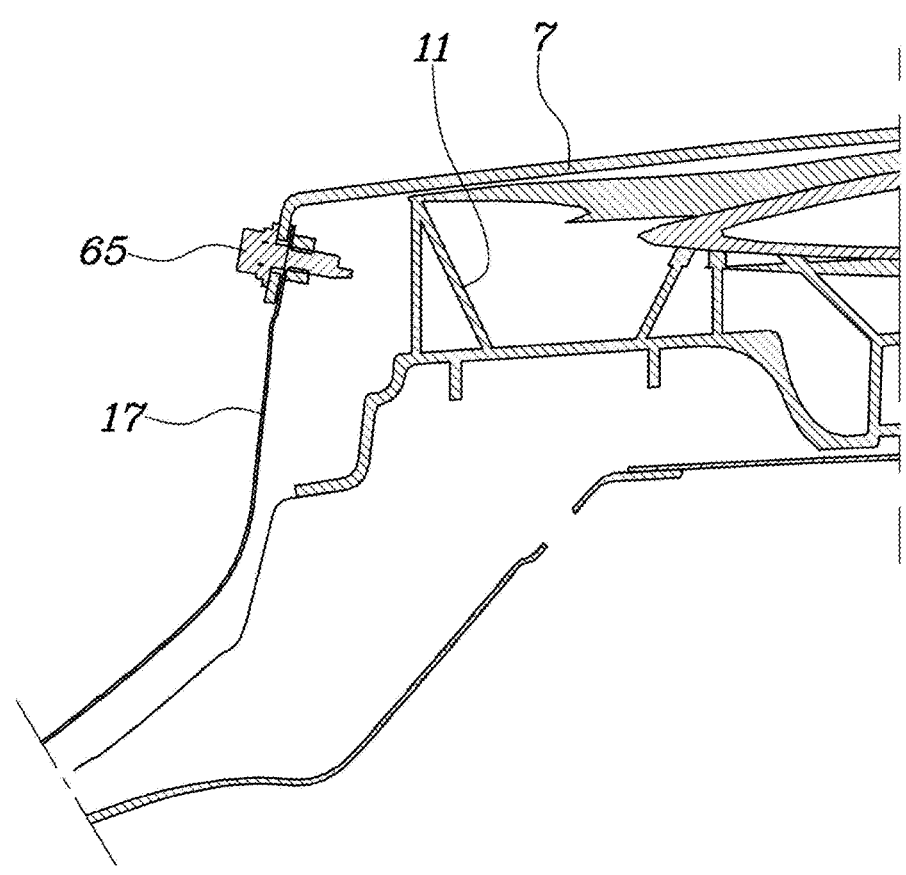
FIG. 20 is a cross-sectional view taken along line IIX-IIX in FIG. 1.

That is, as shown in FIG. 20, in the state in which the rear flange 63 is formed at the rear end portion of the external garnish 7, the rear flange 63 includes the C-coupling bolt 65 coupled to a pillar while surrounding the upper end portion of the pillar at the rearmost side of the vehicle.

Accordingly, it is possible to achieve a smooth and desirable finish between the external garnish 7 and the upper end portion of the C-pillar 17, securing a stable coupled state between the upper vehicle body 13 and the lower vehicle body 5.

The external garnish 7 may be formed by connecting a plurality of garnish portions divided in the longitudinal direction of the vehicle body, and the divided garnish portions may be coupled to each other by a hook coupling method.

That is, the external garnish 7 is formed of an injection-molded material of plastic resin, and is not integrally formed to extend in the longitudinal direction of the vehicle body. As shown in the drawing, a front garnish portion body 67 and a rear garnish portion body 69 are separately molded, and then the same are combined by the hook coupling method to be integrated with each other.

Figure 21:
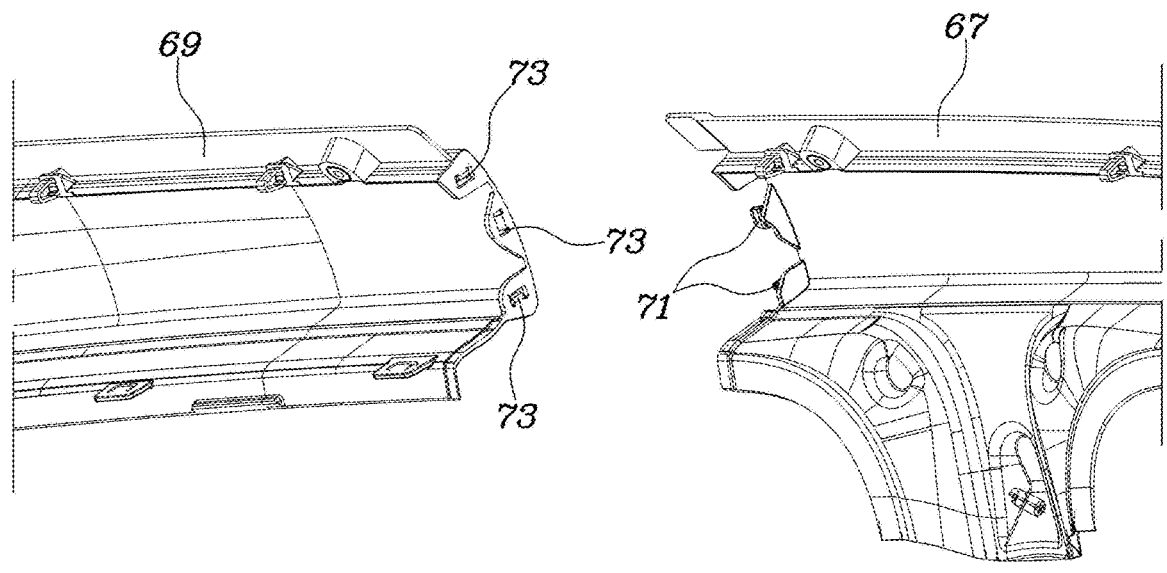
FIG. 21 is a detailed view of a portion IIXI in FIG. 6.
Figure 22:
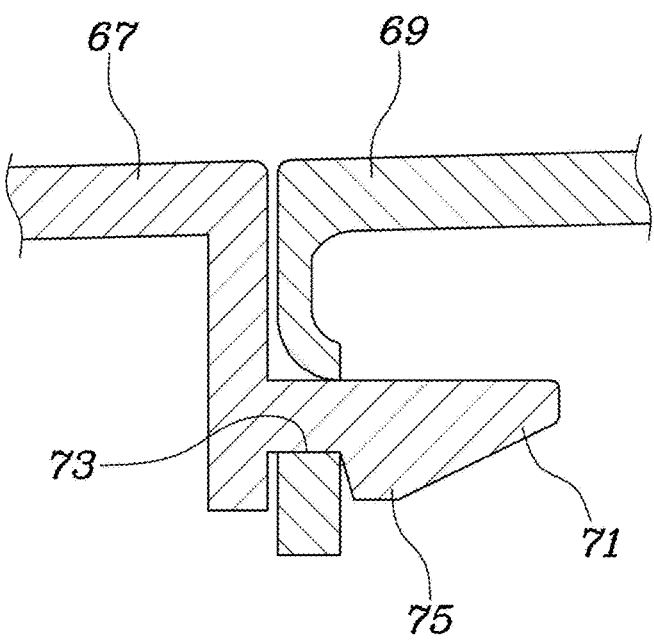
FIG. 22 is a cross-sectional view showing the state in which a hook and a hook hole in FIG. 21 are coupled to each other.

As shown in FIG. 21, one of the garnish portions coupled to each other includes a plurality of hooks 71 provided at the end portion thereof and protruding toward the other garnish portion, and the other garnish portion includes a plurality of hook holes 73 provided at the end portion thereof and formed to allow the plurality of hooks 71 to be respectively coupled thereto.

For example, in the exemplary embodiment of the present disclosure, the plurality of hooks 71 are provided in the front garnish portion body 67, and the plurality of hook holes 73 are formed in the rear garnish portion body 69.

Therefore, when the hooks 71 of the front garnish portion body 67 are respectively coupled to and inserted into the hook holes 73 of the rear garnish portion body 69, the front garnish portion body 67 and the rear garnish portion body 69 are integrated with each other to form the external garnish 7.

Each of the hooks 71 includes a hook jaw 75 formed to be integrated thereinto and configured to prevent separation thereof from the hook hole 73 after being inserted into the hook hole 73. Here, each of the hooks 71 and each of the hook jaws 75 are formed to face different directions, as shown in the drawing. Accordingly, in the state in which the plurality of hooks 71 are respectively inserted into the hook holes 73, directions elastically supported by each of the hooks 71 and each of the hook jaws 75 are different from each other, maintaining a stable coupled state and preventing each of the hooks 71 from being easily separated from a corresponding one of the hook holes 73.

As is apparent from the above description, various aspects of the present disclosure are directed to providing a vehicle body structure configured for easily varying a part of configurations of a vehicle body while reducing the number of vehicle body parts, achieving a competitive edge in the future transportation market of diversified small-quantity production.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle body structure comprising:
   a roof side assembly connecting upper end portions of pillars of a vehicle body in a longitudinal direction of the vehicle body, wherein a front portion of the roof side assembly constitutes an A-pillar and a remaining portion of the roof side assembly connects to upper end portions of other pillars of the vehicle body;
   at least one mounting bracket fixing the roof side assembly to a lower vehicle body; and
   an external garnish coupled to an outside of the roof side assembly, wherein the roof side assembly includes:

a pipe extending in the longitudinal direction of the vehicle body, the pipe including a closed cross-section; and a molding member injection-molded with the pipe inserted thereinto, wherein a plurality of nut members and a plurality of insert brackets are mounted on the pipe, and wherein the molding member is molded to expose a portion including the nut members mounted thereon toward an interior side of the vehicle body and to surround the insert brackets.

2. The vehicle body structure of claim 1, wherein the molding member is injection-molded with a plurality of insert nuts inserted thereinto.

3. The vehicle body structure of claim 1, wherein the molding member of the roof side assembly includes a plurality of loop coupling holes formed therein and coupled to the external garnish, and wherein the external garnish includes a plurality of loop rings provided therein and respectively inserted into the plurality of loop coupling holes, wherein each of the loop rings includes a closed loop shape partially integrated into the external garnish.

4. The vehicle body structure of claim 1, wherein the external garnish includes a plurality of coupling bosses provided therein, and wherein each of the coupling bosses includes a coupling screw coupled thereto and configured to penetrate the molding member to be coupled thereto.

5. The vehicle body structure of claim 1, wherein the external garnish includes a plurality of loop rings protruding toward the molding member, a plurality of coupling bosses, and a plurality of hook plates, wherein the molding member includes a plurality of loop coupling holes formed therein and configured to allow the plurality of loop rings to be respectively inserted thereinto and fixed therein, and a plurality of hook plate holes formed therein and configured to allow the plurality of hook plates to be respectively inserted thereinto and fixed therein, and wherein the plurality of coupling bosses have a plurality of coupling screws respectively coupled thereto and configured to penetrate the molding member to be coupled thereto.

6. The vehicle body structure of claim 5, wherein the plurality of loop rings are provided on an upper side of the external garnish in the longitudinal direction of the vehicle body, wherein each of the coupling bosses is disposed between the loop rings on the upper side of the external garnish, and wherein the plurality of hook plates are provided in the longitudinal direction of the vehicle body below locations at which the loop rings and the coupling bosses of the external garnish are formed.

7. The vehicle body structure of claim 6, wherein the plurality of hook plates are additionally provided on a front side of the vehicle body of the external garnish.

8. The vehicle body structure of claim 1, wherein an A-pillar reinforcement is provided between the outside of the vehicle body of the roof side assembly and the external garnish to be coupled to the external garnish, and wherein the external garnish is coupled to the A-pillar reinforcement by a plurality of coupling members coupled thereto in an upward-and-downward direction, a forward-and-rearward direction, and a left-and-right direction thereof.

9. The vehicle body structure of claim 8, wherein the plurality of coupling members include:

a first A-coupling bolt coupled to the A-pillar reinforcement by penetrating the external garnish from an upper side of a front end portion of the external garnish toward a lower side of the front end portion;

a second A-coupling bolt coupled to the A-pillar reinforcement and the molding member by penetrating the external garnish in the left-and-right direction from a side of the external garnish; and a third A-coupling bolt coupled to the A-pillar reinforcement and the molding member by penetrating the external garnish from a rear of the external garnish toward a front thereof.

10. The vehicle body structure of claim 1, wherein the molding member includes a garnish mounting boss formed to be integrated into a portion thereof, the portion being connected to an upper end portion of a B-pillar of the lower vehicle body among the pillars, and wherein the external garnish includes a garnish B-pillar mounting hole formed therein and configured to allow a coupling member coupled to the garnish mounting boss to pass therethrough.

11. The vehicle body structure of claim 1, wherein the external garnish includes:

a rear flange provided at a rear end portion thereof coupled to a C-pillar among the pillars and formed to surround a rear upper side of the C-pillar; and a C-coupling bolt coupled to the C-pillar by penetrating the rear flange from a rear of the rear flange toward a front thereof.

12. The vehicle body structure of claim 1, wherein the external garnish is formed by connecting a plurality of garnish portions divided in the longitudinal direction of the vehicle body, and wherein the divided garnish portions are coupled to each other by a hook coupling method.

13. The vehicle body structure of claim 12, wherein one of the garnish portions coupled to each other includes a plurality of hooks provided at an end portion thereof and protruding toward another garnish portion, and another garnish portion includes a plurality of hook holes provided at an end portion thereof and formed to allow the plurality of hooks to be respectively coupled thereto.

14. The vehicle body structure of claim 1, wherein the external garnish includes a thickness reduction portion having a connection portion, and wherein the thickness reduction portion is formed by reducing a thickness of a lower end portion of a portion of the external garnish toward a surface of at least one pillar among the pillars, the portion being coupled to the at least one pillar of the vehicle body.

15. A vehicle body structure comprising:

a roof side assembly connecting upper end portions of pillars of a vehicle body in a longitudinal direction of the vehicle body, wherein a front portion of the roof side assembly constitutes an A-pillar and a remaining portion of the roof side assembly connects to upper end portions of other pillars of the vehicle body;

at least one mounting bracket fixing the roof side assembly to a lower vehicle body; and an external garnish coupled to an outside of the roof side assembly,

13 wherein the roof side assembly includes:
  a pipe extending in the longitudinal direction of the vehicle body, the pipe including a closed cross-section; and
  a molding member injection-molded with the pipe inserted thereinto, wherein the at least one mounting bracket includes:
  an A-pillar mounting bracket coupling the roof side assembly to a fender of the lower vehicle body; and
  a B-pillar mounting bracket coupling the roof side assembly to an upper end portion of a B-pillar of the lower vehicle body.

16. The vehicle body structure of claim 15,
wherein the A-pillar mounting bracket is mounted on an interior side of the roof side assembly, and
wherein an A-pillar reinforcement is provided between the outside of the vehicle body of the roof side assembly and the external garnish to be coupled to the external garnish.

17. A vehicle body structure comprising:
a roof side assembly connecting upper end portions of pillars of a vehicle body in a longitudinal direction of the vehicle body, wherein a front portion of the roof side assembly constitutes an A-pillar and a remaining portion of the roof side assembly connects to upper end portions of other pillars of the vehicle body;
at least one mounting bracket fixing the roof side assembly to a lower vehicle body; and
an external garnish coupled to an outside of the roof side assembly,

14 wherein the roof side assembly includes:
  a pipe extending in the longitudinal direction of the vehicle body, the pipe including a closed cross-section; and
  a molding member injection-molded with the pipe inserted thereinto, wherein the external garnish includes a plurality of hook plates protruding toward the molding member, and
wherein the molding member includes a plurality of hook plate holes formed therein and configured to allow the plurality of hook plates to be respectively inserted thereinto and fixed therein.

18. The vehicle body structure of claim 17, wherein each of the hook plates of the external garnish includes:
  a flat plate portion protruding from the external garnish;
  an elastic piece including one end portion fixed to an internal center portion of a first side surface of the flat plate portion; and
  a hook protrusion protruding from the elastic piece.

19. The vehicle body structure of claim 18, wherein each of the hook plate holes of the molding member includes side protrusions provided on opposite portions thereof and protruding in an inward direction thereof, wherein the side protrusions respectively support opposite portions of a second side surface of the flat plate portion in a state in which the hook plates are inserted into the hook plate holes, wherein the second side surface is opposite to the first side surface from which the hook protrusion protrudes.

* * * * *